(12) United States Patent
Li et al.

(10) Patent No.: US 10,128,503 B2
(45) Date of Patent: Nov. 13, 2018

(54) CONDUCTIVE FIBROUS MATERIALS

(71) Applicant: Agency for Science, Technology and Research, Singapore (SG)

(72) Inventors: Xu Li, Singapore (SG); Chao Bin He, Singapore (SG); Suxi Wang, Singapore (SG); Siew Yee Wong, Singapore (SG); Shilin Chen, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/890,410

(22) PCT Filed: May 12, 2014

(86) PCT No.: PCT/SG2014/000207
§ 371 (c)(1),
(2) Date: Nov. 10, 2015

(87) PCT Pub. No.: WO2014/182250
PCT Pub. Date: Nov. 13, 2014

(65) Prior Publication Data
US 2016/0111723 A1    Apr. 21, 2016

(30) Foreign Application Priority Data
May 10, 2013 (SG) .............................. 201303649-6

(51) Int. Cl.
*H01M 4/04* (2006.01)
*H01M 4/587* (2010.01)
(Continued)

(52) U.S. Cl.
CPC ............ *H01M 4/587* (2013.01); *D01D 5/003* (2013.01); *D01F 9/17* (2013.01); *D01F 9/24* (2013.01);
(Continued)

(58) Field of Classification Search
CPC .. H01M 4/0471; H01M 4/133; H01M 4/1393; H01M 4/364; H01M 4/587;
(Continued)

(56) References Cited

U.S. PATENT DOCUMENTS

| 3,461,082 A * | 8/1969 | Fukuoka .................. D01F 9/17 |
| | | 264/DIG. 19 |
| 8,012,399 B2 * | 9/2011 | Gee ........................ A24D 3/163 |
| | | 264/29.2 |
| 2012/0251925 A1 * | 10/2012 | Sasaki .................. D01D 5/0038 |
| | | 429/530 |

FOREIGN PATENT DOCUMENTS

WO    WO-2014/182250    11/2014

OTHER PUBLICATIONS

Imaizumi, Shinji, et al., "Phenolic Resin-Based Carbon Thin Fibers Prepared by Electrospinning: Additive Effects of Poly(vinyl butyral) and Electrolytes", *Polymer Journal*, 41(12), (2009), 1124-1128.
(Continued)

*Primary Examiner* — Brittany L Raymond
(74) *Attorney, Agent, or Firm* — Schwegman Lundberg & Woessner, P.A.

(57) ABSTRACT

There is provided a conductive fibrous material comprising a plurality of carbonaceous fibers, wherein each carbonaceous fiber is fused to at least one other fiber. The carbonaceous fibers may be fused at fiber-to-fiber contact points by a polymer. The process of making the conductive fibrous material comprises mixing a phenolic polymer with a second polymer to form a polymer solution, preparing phenolic fibers having nano- or micro-scale diameters by electrospinning the polymer solution, and subsequent carbonization of the obtained phenolic fibers, thereby generating carbonaceous fibers, wherein each carbonaceous fiber is fused to at
(Continued)

least one other fiber. The conductive fibrous material may be useful in electrode materials for energy storage devices.

18 Claims, 13 Drawing Sheets

(51) Int. Cl.

| | | |
|---|---|---|
| *D01D 5/00* | (2006.01) | |
| *D04H 1/4242* | (2012.01) | |
| *D04H 1/728* | (2012.01) | |
| *D01F 9/24* | (2006.01) | |
| *H01M 4/133* | (2010.01) | |
| *D01F 9/17* | (2006.01) | |
| *D01F 11/12* | (2006.01) | |
| *H01M 4/1393* | (2010.01) | |
| *H01M 4/36* | (2006.01) | |
| *H01M 4/62* | (2006.01) | |
| *H01M 4/02* | (2006.01) | |

(52) U.S. Cl.
CPC .......... *D01F 11/128* (2013.01); *D04H 1/4242* (2013.01); *D04H 1/728* (2013.01); *H01M 4/0471* (2013.01); *H01M 4/133* (2013.01); *H01M 4/1393* (2013.01); *H01M 4/364* (2013.01); *H01M 4/622* (2013.01); *D10B 2101/12* (2013.01); *D10B 2101/122* (2013.01); *D10B 2401/16* (2013.01); *H01M 2004/027* (2013.01)

(58) Field of Classification Search
CPC .......... H01M 4/622; D01D 5/003; D01F 9/17; D01F 9/24; D01F 11/128; D04H 1/728; D04H 1/4242; D01B 2401/16; D01B 2101/00

See application file for complete search history.

(56) References Cited

OTHER PUBLICATIONS

Kadla, J. F., et al. "Lignin-based carbon fibers for composite fiber applications", *Carbon*, 40(15), (2002), 2913-2920.

"International Application No. PCT/SG2014/000207, International Preliminary Report on Patentability dated Mar. 20, 2015", (Mar. 20, 2015), 21 pgs.

"International Application No. PCT/SG2014/000207, International Search Report and Written Opinion dated Jul. 18, 2014", (Jul. 18, 2014), 9 pgs.

\* cited by examiner

CONDUCTIVE FIBROUS MATERIALS

PRIORITY CLAIM TO RELATED APPLICATIONS

This application is a U.S. national stage application filed under 35 U.S.C. § 371 from International Application Serial No. PCT/SG2014/000207, which was filed 12 May 2014, and published as WO2014/182250 on 13 Nov. 2014, and which claims priority to Singapore Application No. 201303649-6, filed 10 May 2013, which applications and publication are incorporated by reference as if reproduced herein and made a part hereof in their entirety, and the benefit of priority of each of which is claimed herein.

TECHNICAL FIELD

The present invention generally relates to conductive fibrous materials that may be used in electrode materials useful in energy storage devices. The present invention also relates to processes for making said conductive fibrous materials.

BACKGROUND

With rapid development of the global economy, the depletion of fossil fuels and increasing environmental pollution, advanced technologies for energy conversion and storage are being extensively studied around the world. Rechargeable lithium-ion batteries have been regarded as one of the most efficient and environmentally benign types of energy storage devices and are widely utilized in various portable electronic devices, hybrid electric vehicles and emerging smart grids. Carbon materials as electrode materials of lithium-ion batteries have been predominantly used and are commercially viable for industrialization because of their low cost, easy accessibility and processability. An example of such carbon materials is graphite.

However, one problem with utilizing graphite is that it suffers from low energy density (theoretical capacity 372 mA h g$^{-1}$) when used as an anode material for lithium-ion batteries. To better satisfy the ever-growing demand for high-performance power sources, the development of nano-structured carbon materials (such as graphene, carbon nanotubes, fullerenes, etc.) with high conductivity and accessible specific surface area has attracted great research interest in the last decade.

Nanocarbons have been considered as promising electrode materials for the next generation of lithium-ion batteries. However, one problem with present commercial carbon nanomaterials is that they are mostly fabricated from non-renewable resources (such as coals and petroleum) or relatively expensive polymers (such as polyacrylonitrile (PAN) and phenolic resins). However, energy shortages and growing market demands still necessitate a need to find cost-effective, environmentally benign and renewable sources for producing high performance nanocarbon materials.

Another problem with present commercial carbon nanomaterials is that they may require complicated and expensive fabrication processes which may not be suitable for large-scale applications.

Another problem with present commercial carbon nanomaterials when used in an electrode material for energy storage devices is that they may be unstable when used in different electrolytes and may not perform well in a wide range of temperatures.

A further problem with present commercial carbon nanomaterials is that they may not be free-standing without using a binding agent. Most commercially available carbon electrode materials are in powder form and are typically mixed with a binding agent (for example, polyvinylidene fluoride) during the fabrication process. The use of a binding agent may disadvantageously result in a tedious fabrication process and poorer electrochemical performance. Furthermore, the use of a binding agent may contribute substantially to the overall cost of fabrication.

There is therefore a need to provide conductive materials that overcome, or at least ameliorate, one or more of the disadvantages described above.

There is a need to provide conductive materials that may be fabricated from low-cost, abundant, environmentally benign and renewable materials.

There is a need to provide conductive materials useful in electrode materials for lithium-ion batteries that exhibit high specific capacity.

There is a need to provide conductive materials that are easily processable, have large accessible surface area, high carbon purity, high electrical conductivity and high structural integrity.

There is a need to provide conductive materials that may be fabricated through conventional and straightforward processes which may be conducted on a large commercial scale.

There is a need to provide conductive materials are stable when used in different electrolytes and perform well in a wide range of temperatures when used in an electrode material for energy storage devices.

There is a need to provide conductive materials that are free-standing without using any binding agent, thereby simplifying the fabrication process and reducing its overall cost.

SUMMARY

According to a first aspect, there is provided a conductive fibrous material comprising a plurality of carbonaceous fibers, wherein each carbonaceous fiber is fused to at least one other fiber.

Advantageously, the carbonaceous fibers are obtained from a phenolic fiber source, the phenolic fiber source having undergone a carbonization step.

Advantageously, the conductive fibrous material may be useful in an electrode material for energy storage devices.

According to a second aspect, there is provided an electrode material for energy storage devices comprising the disclosed conductive fibrous material.

Advantageously, the disclosed conductive fibrous materials display high specific capacities when used in an electrode material for energy storage devices.

Also advantageously, the disclosed conductive fibrous materials may be easily processable, have large accessible surface areas, high carbon purity, high electrical conductivity and high structural integrity when used in an electrode material for energy storage devices.

Advantageously, the disclosed conductive fibrous materials comprising fused carbonaceous fibers may exhibit higher electrical conductivity and better electrochemical performance when used in an electrode material for energy storage devices when compared with conductive fibrous materials comprising unfused carbonaceous fibers.

Yet another advantage is that the disclosed conductive fibrous materials may be stable when used in different electrolytes and may perform well in a wide range of temperatures when used in an electrode material for energy storage devices.

Further advantageously, the disclosed conductive fibrous materials may be free-standing without using any binding agent, thereby simplifying the fabrication process and reducing its overall cost. Advantageously, the disclosed conductive fibrous materials may be a free-standing carbon fibrous mat with high structural integrity that can be directly used as an electrode material, thereby avoiding the tedious step of electrode fabrication.

In one embodiment, the carbonaceous fibers are fused at fiber-to-fiber contact points by a polymer.

Advantageously, the polymer may result in the fusing together of adjacent carbonaceous fibers.

In a further embodiment, the polymer may be a low-melting point polymer.

Advantageously, the strong melting behavior of the polymer may result in the fusing together of adjacent carbonaceous fibers during heat treatment.

In one embodiment, the disclosed conductive fibrous materials may be fabricated from lignin.

Therefore advantageously, the disclosed conductive fibrous materials may be fabricated from low-cost, abundant, environmentally benign and renewable materials.

In a further embodiment, the disclosed conductive fibrous materials may be doped with nitrogen.

Advantageously, the nitrogen-doped conductive fibrous materials may further improve the capacity as well as the conductivity of the disclosed conductive fibrous materials when used as an, electrode material in energy storage devices.

According to a third aspect, there is provided a fibrous mat comprising the disclosed conductive fibrous material.

Advantageously, the disclosed fibrous mat may be free standing and tough enough to be punched to electrode materials.

According to a fourth aspect, there is provided an electrode material for energy storage devices comprising the disclosed conductive fibrous material or disclosed fibrous mat.

Advantageously, the use of the disclosed electrode material in energy storage devices results in improved electrochemical performance.

According to a fifth aspect, there is provided process for forming a conductive fibrous material, comprising:
  a) mixing a phenolic polymer with a second polymer to form a polymer solution;
  b) preparing phenolic fibers having nano- or micro-scale diameters by electrospinning the polymer solution of step a); and
  c) carbonizing the phenolic fibers obtained through step b), thereby generating carbonaceous fibers, wherein each carbonaceous fiber is fused to at least one other fiber.

The method step advantageously comprises an oxidizing step before the carbonization step. The oxidizing step advantageously stabilizes the phenolic fibers.

Advantageously, the carbonization step is undertaken in an inert atmosphere, preferably in argon.

Advantageously, the melting of the second polymer during the carbonization step may fuse adjacent phenolic fibers to generate fused carbonaceous fibers.

Advantageously, the disclosed conductive fibrous materials may be easily processable and may be fabricated through conventional and straightforward processes which may be conducted on a large commercial scale.

Further advantageously, the disclosed conductive fibrous materials may be free-standing without using any binding agent, thereby reducing overall costs of fabrication.

Advantageously, the second polymer may greatly improve the viscosity and spinnability of the polymer solution during electrospinning.

According to a sixth aspect, there is provided an electronic device comprising the disclosed conductive fibrous material, the disclosed fibrous mat, or the disclosed electrode material.

Definitions

The following are some definitions that may be helpful in understanding the description of the present invention. These are intended as general definitions and should in no way limit the scope of the present invention to those terms alone, but are put forth for a better understanding of the following description.

Unless the context requires otherwise or specifically stated to the contrary, integers, steps, or elements of the invention recited herein as singular integers, steps or elements clearly encompass both singular and plural forms of the recited integers, steps or elements.

As used herein, the term "alkylene" includes within its meaning divalent straight chain or branched chain saturated aliphatic groups having from 1 to 12 carbon atoms, eg, 1, 2, 3, 4, 5, 6, 7, 8, 9, 10, 11 or 12 carbon atoms. For example, the term alkylene includes, but is not limited to, methylene, ethylene, 1-propylene, isopropylene, 1-butylene, 2-butylene, isobutylene, tert-butylene, amylene, 1,2-dimethylpropylene, 1,1-dimethylpropylene, pentylene, isopentylene, hexylene, 4-methylpentylene, 1-methylpentylene, 2-methylpentylene, 3-methylpentylene, 2,2-dimethylbutylene, 3,3-dimethylbutylene, 1,2-dimethylbutylene, 1,3-dimethylbutylene, 1,2,2-trimethylpropylene, 1,1,2-trimethylpropylene, 2-ethylpentylene, 3-ethylpentylene, heptylene, 1-methylhexylene, 2,2-dimethylpentylene, 3,3-dimethylpentylene, 4,4-dimethylpentylene, 1,2-dimethylpentylene, 1,3-dimethylpentylene, 1,4-dimethylpentylene, 1,2,3-trimethylbutylene, 1,1,2-trimethylbutylene, 1,1,3-trimethylbutylene, 5-methylheptylene, 1-methylheptylene, octylene, nonylene, decylene, undecylene, dodecylene and the like. Alkylene groups may be optionally substituted.

As used herein, the term "polyether" refers to a polymer having the repeat unit [—O—R]—, wherein R is a hydrocarbylene group having 2 to 5 carbon atoms. The polyether may also be a random or block copolymer comprising different repeat units which contain different R groups.

As used herein, the term "polyester" refers to a polymer comprising an ester group in its main chain, for example, polymers comprising a repeating —(O—R—C(=O))— unit or a repeating —(O—C(=O)—R)— unit, wherein R is a hydrocarbylene group having 2 to 5 carbon atoms. The polyester may also be a random or block copolymer comprising different repeat units which contain different R groups.

As used herein, the term "polyalkylene oxide" refers to a polymer comprising a repeating —(O-alkylene)-unit, for example, —(OCH2CH2)n-OH, or —(OCH2CH2)n-OCH3, wherein n indicates the number of repeating units.

As used herein, the term "polyhydroxy alkanoate" refers to polymeric hydroxy-alkanoates. Hydroxy-alkanoates may be esters of hydroxyacids.

As used herein, the term "lignin" refers to any lignin or lignin derivative which include Brauns' lignin, cellulolytic enzyme lignin, dioxane acidolysis lignin, milled wood lignin, Klason lignin, periodate lignin, kraft lignin, softwood kraft lignin, hardwood kraft lignin, lignosulfates, lignosulfonates, organosolv lignin, and steam explosion lignin or any substances made in whole or in part from lignin or any subunits, monomers, or other components derived therefrom. Thus, lignin is meant to include lignin, and/or any compound comprising lignin or the residue thereof and refers to any polymer comprising p-hydroxyphenyl units, syringyl units, and guaiacyl units.

As used herein, a "low melting-point polymer" refers to a polymer having a melting point of about below 200° C. The low-melting point polymer may include polyethylene oxide, polycaprolactone, polypropylene oxide, polyhydroxybutyrate, pluronic F127 etc.

As used herein, the term "major portion" in the context of this specification and with reference to fused and unfused fibers, refers to an amount greater than 50%, greater than 55%, greater than 60%, greater than 65%, greater than 70%, greater than 75%, greater than 80%, greater than 85%, greater than 90%, or greater than 95%.

As used herein, the term "micro" is to be interpreted broadly to include dimensions between about 1 micron to about 500 microns.

As used herein, the term "nano" is to be interpreted broadly to include dimensions less than about 1000 nm.

As used herein, the term "carbonaceous" in connection with fiber(s) refers to fiber(s) with a carbon content greater than about 70 weight percent. The carbon content may be increased as a result of an irreversible chemical reaction of a carbonaceous fiber precursor, for example by heat treatment, to render the fibers carbonaceous. The carbonaceous fibers may be produced from polymeric precursor fibers, such as phenolic fibers.

As used herein, the term "carbonaceous fiber precursor" refers to polymeric precursor fibers that are capable of undergoing an irreversible chemical reaction, for example, heat treatment, to produce carbonaceous fibers. An example of polymeric precursor fibers is phenolic fibers.

As used herein, the term "phenolic fiber or fibers" refers to fibers prepared by electrospinning, melt spinning or wet spinning precursor materials, wherein the precursor material is a phenolic polymer.

As used herein, the term "phenolic polymer" refers to a polymer comprising phenolic monomers. The phenolic polymer may be derived from lignin.

As used herein, the terms "stabilized" or "stabilizing", when used in the context of a process for preparing conductive fibrous materials, refers to carbonaceous precursor fibers which have been oxidized at a specific temperature in the presence of oxygen. It will be understood that in some instances the fibers are oxidized by chemical oxidants at lower temperatures.

As used herein, the term "polymer solution" is to be interpreted broadly to include any solution comprising one or more polymer, copolymer or polymer blend dissolved in a solvent and which comprises a concentration of polymers that is capable of being electrospun. Exemplary polymers include, but are not limited to, polyethers, polyesters, polyalkylene oxide, poloxamer, polylactone, polyhydroxylkanoate, polyethylene glycol, polyethylene oxide, polypropylene glycol, polypropylene oxide, polycaprolactone, polyhydroxybutyrate, poloxamer 407, pluronic F127, poly(vinylidenefluoride), poly(vinylidene fluoride-co-hexafluoropropylene), polyacrylonitrile, poly(acrylonitrile-co-methacrylate), poly(methylmethacrylate), polyvinylchloride, poly(vinylidenechloride-co-acrylate), polyethylene, polypropylene, nylon series such as nylon12 and nylon-4,6, aramid, polybenzimidazole, poly(vinylalcohol), cellulose, cellulose acetate, cellulose acetate butylate, poly(vinyl pyrolidone-vinyl acetates), poly(bis-(2-methoxy-ethoxy-ethoxy)) phosphazene(MEEP), poly(ethylene imide), poly (ethylene succinate), poly(ethylene sulphide), poly (oxymethylene-oligo-oxyethylene), poly(vinyl acetate), polyaniline, poly(ethylene terephthalate), SBS copolymer, poly(lactic acid), polypeptide, biopolymer such as protein, pitch series such as coal-tar pitch and petroleum pitch. Copolymers and blends of the above polymers may be used.

As used herein, the term "poloxamer" refers to non-ionic triblock copolymers composed of a central hydrophobic chain of polypropylene oxide flanked by two hydrophilic chains of polyethylene oxide. Poloxamers are also known by the trade names Synperonics® (by Croda), Pluronics® (by BASF) and Kolliphor® (by BASF).

As used herein, "poloxamer 407" refers to a poloxamer with a polypropylene oxide molecular mass of 4,000 g/mol and a 70% polyethylene oxide content. Poloxamer 407 is a hydrophilic non-ionic surfactant of the more general class of copolymers known as poloxamers. Poloxamer 407 is a triblock copolymer consisting of a central hydrophobic block of polypropylene glycol flanked by two hydrophilic blocks of polyethylene glycol. The approximate lengths of the two PEG blocks is 101 repeat units while the approximate length of the propylene gycol block is 56 repeat units. Poloxamer 407 is also known by the BASF trade name Pluronic F127 or by the Croda trade name Synperonic PE/F 127.

As used herein, the term "polar solvent" refers to a solvent wherein the solvent molecules have an uneven distribution of electron density. Examples of polar solvents are water, water-miscible organic solvents, or mixtures thereof such as acetone, acetonitrile, N,N-dimethylformamide (DMF), tetrahydrofuran (THF), ethyl acetate (EtOAc), formamide, dimethyl sulfoxide (DMSO), acetamide, water, ethanol, methanol, ethanol, isopropanol, n-propanol, ethylene glycol, triethylene glycol, glycerol, polyethylene glycol, propylene glycol, dipropylene glycol, polypropylene glycol, random and block copolymers of ethylene oxide and propylene oxide, dimethoxytetraglycol, butoxytriglycol, trimethylene glycol trimethyl ether, ethylene glycol dimethyl ether, ethylene glycol monobutyl ether, ethylene glycol monoethyl ether, and mixtures thereof, but are not limited thereto The terms "a" and "an" are defined as one or more unless this disclosure explicitly requires otherwise.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically, disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of the disclosed conductive fibrous material will now be disclosed.

According to a first aspect, there is provided a conductive fibrous material comprising a plurality of carbonaceous fibers, wherein each carbonaceous fiber is fused to at least one other fiber.

In one embodiment, the carbonaceous fibers are fused at fiber-to-fiber contact points by a polymer.

In a further embodiment, a major portion of the carbonaceous fibers are fused at multiple fiber-to-fiber contact points.

In one embodiment, the polymer may be a low-melting point polymer. The low-melting point polymer may have a melting point of equal to or below 200° C., equal to or below 190° C., equal to or below 180° C., equal to or below 170° C., equal to or below 160° C., equal to or below 150° C., equal to or below 140° C., equal to or below 130° C., equal to or below 120° C., equal to or below 110° C., equal to or below 100° C., equal to or below 90° C., equal to or below 80° C., equal to or below 70° C., equal to or below 60° C., equal to or below 50° C., equal to or below 40° C., equal to or below 30° C.

The molecular weight of the polymer may be from about 100,000 to about 1,000,000, or about 100,000 to about 900,000, or about 100,000 to about 800,000, or about 100,000 to about 700,000, or about 100,000 to about 600,000, or about 100,000 to about 500,000, or about 100,000 to about 400,000, or about 100,000 to about 300,000, or about 100,000 to about 200,000, or about 200,000 to about 1,000,000, or about 300,000 to about 1,000,000, or about 400,000 to about 1,000,000, or about 500,000 to about 1,000,000, or about 600,000 to about 1,000,000, or about 700,000 to about 1,000,000, or about 800,000 to about 1,000,000, or about 900,000 to about 1,000,000.

The polymer may be selected from copolymers of acrylate and methacrylate, copolymers of ethylene oxide and propylene oxide, homo-polyethers, co-polyethers, homo-polyesters, co-polyesters, co-polyether-polyesters, and polymer blends thereof. The homo- or co-polyether may be selected from the group consisting of homo-(polyalkylene oxide), co-(polyalkylene oxide) and poloxamer. The homo- or co-polyether may be selected from the group consisting of homo-(polylactone), co-(polylactone), homo-(polyhydroxyalkanoate) or co-(polyhydroxyalkanoate). In one embodiment, the polymer may be polyethylene glycol, polyethylene oxide, polypropylene glycol, polypropylene oxide, polycaprolactone, polyhydroxybutyrate, poloxamer 407, or pluronic F127.

The addition of polymer may result in fusing together of adjacent carbonaceous fibers which may be ascribed to the strong melting behavior of said polymer during heat treatment.

In one embodiment, the carbonaceous fiber precursor may be phenolic fibers. In one embodiment, the phenolic fibers may be derived from lignin. The lignin may be selected from the group consisting of organosolv lignin, softwood kraft lignin, hardwood kraft lignin and lignosulfonate.

In one embodiment, the weight ratio of carbonaceous fiber precursor to polymer is from 99:1 to 80:20. The weight ratio may be 95:5, or 90:10, or 85:15, or 80:20, or 75:25, or 70:30, or 65:35.

The disclosed conductive fibrous materials may be of high carbon purity. The conductive fibrous materials may contain more than about 60% carbon content, more than about 65% carbon content, more than about 70% carbon content, more than about 75% carbon content, more than about 80% carbon content, more than about 85% carbon content, more than about 90% carbon content, or more than about 95% carbon content.

In one embodiment, the carbonaceous fibers may have a diameter in the micrometer range. The carbonaceous fibers may have a diameter in the range of about 0.1 to about 80 microns, or about 0.5 to about 80 microns, or about 1 to about 80 microns, or about 5 to about 80 microns, or about 10 to about 80 microns, or about 15 to about 80 microns, or about 20 to about 80 microns, or about 25 to about 80 microns, or about 30 to about 80 microns, or about 35 to about 80 microns, or about 40 to about 80 microns, or about 45 to about 80 microns, or about 50 to about 80 microns, or about 55 to about 80 microns, or about 60 to about 80 microns, or about 65 to about 80 microns, or about 70 to about 80 microns, or about 75 to about 80 microns, or about 0.1 to 75 microns, or about 0.1 to 70 microns, or about 0.1 to 65 microns, or about 0.1 to 60 microns, or about 0.1 to 55 microns, or about 0.1 to 50 microns, or about 0.1 to 45 microns, or about 0.1 to 40 microns, or about 0.1 to 35 microns, or about 0.1 to 30 microns, or about 0.1 to 25 microns, or about 0.1 to 20 microns, or about 0.1 to 15 microns, or about 0.1 to 10 microns, or about 0.1 to 5 microns, or about 0.1 to 1 microns, or about 0.1 to 0.5 microns. In one embodiment, the carbonaceous fibers may have a diameter of about 1 micron. In one embodiment, the carbonaceous fibers may have a diameter of about 0.5 microns.

In another embodiment, the carbonaceous fibers may have a diameter in the nanometer range. The carbonaceous fibers may have a diameter of about 1 to about 1000 nm, or about 1 to about 900 nm, or about 1 to about 800 nm, or about 1 to less than about 700 nm, or about 1 to about 600 nm, or about 1 to about 500 nm, or about 1 to about 400 nm, or about 1 to about 300 nm, or about 1 to about 200 nm, or about 1 to about 100 nm, or about 1 to about 50 nm, or about 100 to about 1000 nm, or about 200 to about 1000 nm, or about 300 to about 1000 nm, or about 400 to about 1000 nm, or about 5.00 to about 1000 nm, or about 600 to about 1000 nm, or about 700 to about 1000 nm, or about 800 to about 1000 nm, or about 900 to about 1000 nm. In embodiment, the carbonaceous fibers may have a diameter of about 1000 nm. In another embodiment, the carbonaceous fibers may have a diameter of about 500 nm.

In one embodiment, the conductive fibrous material may be doped with nitrogen. The content of nitrogen may be in the range of about 0.1 to about 15.0%, or about 0.5 to about 15.0%, or about 1.0 to about 15.0%, or about 2.0 to about, 15.0%, or about 3.0 to about 15.0%, or about 4.0 to about 15.0%, or about 5.0 to about 15.0%, or about 6.0 to about 15.0%, or about 7.0 to about 15.0%, or about 8.0 to about 15.0%, or about 9.0 to about 15.0%, or about 10.0 to about 15.0%, or about 11.0 to about 15.0%, or about 12.0 to about 15.0%, or about 13.0 to about 15.0%, or about 14.0 to about 15.0%, or about 0.1 to about 14.0%, or about 0.1 to about 13.0%, or about 0.1 to about 12.0%, or about 0.1 to about 11.0%, or about 0.1 to about 10.0%, or about 0.1 to about 9.0%, or about 0.1 to about 8.0%, or about 0.1 to about 7.0%, or about 0.1 to about 6.0%, or about 0.1 to about 5.0%, or about 0.1 to about 4.0%, or about 0.1 to about 3.0%, or about 0.1 to about 2.0%, or about 0.1 to about 1.0%, or about 0.1 to about 0.5%. The content of nitrogen may be about 12.6%.

In one aspect, there is provided a fibrous mat comprising the disclosed fibrous material.

Advantageously, the disclosed fibrous mats may be free standing and tough enough to be punched to electrodes.

Further advantageously, the disclosed fibrous mats may be applied as a high performance anode material of lithium ion batteries, with a specific capacity of up to 576 mA h g$^{-1}$.

In another aspect, there is provided an electrode material for energy storage devices comprising the disclosed fibrous material.

In a further aspect, there is provided a process for forming a conductive fibrous material, comprising:
 a) mixing a phenolic polymer with a second polymer to form a polymer solution;
 b) preparing phenolic fibers having nano- or micro-scale diameters by electrospinning the polymer solution of step a); and
 c) carbonizing the phenolic fibers obtained through step b), thereby generating carbonaceous fibers, wherein each carbonaceous fiber is fused to at least one other fiber.

In one embodiment, the process further comprises an oxidizing step before the carbonization step. The oxidizing step may be a stabilizing step.

In one embodiment, the stabilizing step comprises heat treating and oxidizing the phenolic fibers.

In a further embodiment, the phenolic fibers are stabilized while raising the temperature from about room temperature to about 200° C. in the presence of oxygen.

The phenolic fibers may be stabilized while raising the temperature from about room temperature to about 190° C., or from about room temperature to about 180° C., or from about room temperature to about 170° C., or from about room temperature to about 160° C., or from about room temperature to about 150° C., or from about room temperature to about 140° C., or from about room temperature to about 130° C., or from about room temperature to about 120° C., or from about room temperature to about 110° C., or from about room temperature to about 100° C. Room temperature may be 25° C. The phenolic fibers may be stabilized while raising the temperature from about 25° C. to about 200° C.

The phenolic fibers may be stabilized while raising the temperature at heating rates of about 0.03° C./min to about 10° C./min, or about 0.06° C./min to about 10° C./min, or about 0.08° C./min to about 10° C./min, or about 1° C./min to about 10° C./min, or about 2° C./min to about 10° C./min, or about 3° C./min to about 10° C./min, or about 4° C./min to about 10° C./min, or about 5° C./min to about 10° C./min, or about 6° C./min to about 10° C./min, or about 7° C./min to about 10° C./min, or about 8° C./min to about 10° C./min, or about 9° C./min to about 10° C./min, or about 0.03° C./min to about 9° C./min, or about 0.03° C./min to about 8° C./min, or about 0.03° C./min to about 7° C./min, or about 0.03° C./min to about 6° C./min, or about 0.03° C./min to about 5° C./min, or about 0.03° C./min to about 4° C./min, or about 0.03° C./min to about 3° C./min, or about 0.03° C./min to about 2° C./min, or about 0.03° C./min to about 1° C./min, or about 0.03° C./min to about 0.08° C./min, or about 0.03° C./min to about 0.06° C./min. The phenolic fibers may be stabilized while raising the temperature at a heating rate of about 1° C./min.

In a further embodiment, the phenolic fibers may be stabilized while raising the temperature from about room temperature to about 200° C. at 1° C./min in the presence of oxygen. In another embodiment, the phenolic fibers may be stabilized in air while raising the temperature from about room temperature to about 200° C. at 1° C./min.

In one embodiment, the carbonizing comprises heat treating the phenolic fibers in an inert atmosphere.

In a further embodiment, the phenolic fibers may be carbonized at a temperature of between about 500° C. to about 1000° C. in an inert atmosphere.

The phenolic fibers may be carbonized at a temperature of about 500° C. to about 950° C., or about 500° C. to about 900° C., or about 500° C. to about 850° C., or about 500° C. to about 800° C., or about 500° C. to about 750° C., or about 500° C. to about 700° C., or about 500° C. to about 650° C., or about 500° C. to about 600° C., or about 500° C. to about 550° C., or about 500° C. to about 950° C., or about 500° C. to about 900° C., or about 500° C. to about 850° C., or about 500° C. to about 800° C., or about 500° C. to about 750° C., or about 500° C. to about 700° C., or about 500° C. to about 650° C., or about 500° C. to about 600° C., or about 500° C. to about 550° C. in one embodiment, the phenolic fibers may be carbonized at about 900° C.

In one embodiment, the phenolic fibers may be carbonized while raising the temperature at heating rates of between about 5° C./min to about 50° C./min, or about 5° C./min to about 40° C./min, or about 5° C./min to about 30° C./min, or about 5° C./min to about 20° C./min, or about 5° C./min to about 10° C./min, or about 10° C./min to about 50° C./min, or about 20° C./min to about 50° C./min, or about 30° C./min to about 50° C./min, or about 40° C./min to about 50° C./min. In one embodiment, the phenolic fibers may be carbonized while raising the temperature at a heating rate of 10° C./min.

In one embodiment, the phenolic fibers may be carbonized at a temperature of about 900° C. at 10° C./min in an inert atmosphere. In a further embodiment, the phenolic fibers may be carbonized in argon at a temperature of about 900° C.

Advantageously, the disclosed conductive fibrous materials may be easily processable and may be fabricated through conventional and straightforward processes which may be conducted on a large commercial scale.

Further advantageously, the disclosed conductive fibrous materials may be free-standing without using any binding agent, thereby simplifying the fabrication process and reducing its overall cost.

Advantageously, the addition of the second polymer may greatly improve the viscosity and spinnability of the polymer solution during electrospinning.

In one embodiment, the weight ratio of phenolic polymer to second polymer may be tuned. In one embodiment, the weight ratio of phenolic polymer to second polymer may be from about 80 to 99 weight percent of phenolic polymer to about 1 to 20 weight percent of second polymer. The weight ratio of phenolic polymer to second polymer may be from about 85 to 99 weight percent of first polymer to about 1 to 15 weight percent of second polymer, 90 to 99 weight percent of first polymer to about 1 to 10 weight percent of second polymer, 95 to 99 weight percent of first polymer to about 1 to 5 weight percent of second polymer. The weight ratio may be 97 weight percent of first polymer to 3 percent of second polymer. The weight ratio may be 90 percent weight percent of first polymer to about 10 weight percent of second polymer.

In one embodiment, the phenolic polymer may be derived from lignin. The lignin may be selected from the group consisting of: organosolv lignin, softwood kraft lignin, hardwood kraft lignin and lignosulfonate.

In another embodiment, the second polymer may be a low-melting point polymer. The low-melting point polymer may have a melting point of equal to or below 200° C., equal to or below 190° C., equal to or below 180° C., equal to or below 170° C., equal to or below 160° C., equal to or below 150° C., equal to or below 140° C., equal to or below 130° C., equal to or below 120° C., equal to or below 110° C., equal to or below 100° C., equal to or below 90° C., equal to or below 80° C., equal to or below 70° C., equal to or below 60° C., equal to or below 50° C., equal to or below 40° C., equal to or below 30° C.

During stabilization and carbonization in the disclosed process, the melting of low-melting point polymer may fuse adjacent phenolic fibers to generate fused carbonaceous fibers.

The molecular weight of the second polymer may be from about 100,000 to about 1,000,000, or about 100,000 to about 900,000, or about 100,000 to about 800,000, or about 100,000 to about 700,000, or about 100,000 to about 600,000, or about 100,000 to about 500,000, or about 100,000 to about 400,000, or about 100,000 to about 300,000, or about 100,000 to about 200,000, or about 200,000 to about 1,000,000, or about 300,000 to about 1,000,000, or about 400,000 to about 1,000,000, or about 500,000 to about 1,000,000, or about 600,000 to about 1,000,000, or about 700,000 to about 1,000,000, or about 800,000 to about 1,000,000, or about 900,000 to about 1,000,000.

The second polymer may be selected from copolymers of acrylate and methacrylate, copolymers of ethylene oxide and propylene oxide, homo-polyethers, co-polyethers, homo-polyesters, co-polyesters, co-polyether-polyesters, and polymer blends thereof. The homo- or co-polyether may be selected from the group consisting of homo-(polyalkylene oxide), co-(polyalkylene oxide) and poloxamer. The homo- or co-polyether may be selected from the group consisting of homo-(polylactone), co-(polylactone), homo-(polyhydroxyalkanoate) or co-(polyhydroxyalkanoate). In one embodiment, the second polymer may be polyethylene glycol, polyethylene oxide, polypropylene glycol, polypropylene oxide, polycaprolactone, polyhydroxybutyrate, poloxamer 407, or pluronic F127.

The addition of second polymer may result in fusing together of adjacent carbonaceous fibers which may be ascribed to the strong melting behavior of said polymer during heat treatment.

The addition of second polymer may greatly improve the viscosity and spinnability of the polymer solution during electrospinning.

In another embodiment, the polymer solution of disclosed step a) further comprises a polar solvent. The polar solvent may be selected from the group consisting of acetone, acetonitrile, N,N-dimethylformamide (DMF), tetrahydrofuran (THF), ethyl acetate (EtOAc), formamide, dimethyl sulfoxide (DMSO), acetamide, water, ethanol, and methanol.

In one embodiment, the disclosed process further comprises doping the carbonaceous fiber(s) with nitrogen. The carbonaceous fibers may be immersed in urea solution and heated from about 25° C. to about 900° C. under an inert atmosphere.

The carbonaceous fibers may be heated from about 25° C. to about 850° C., or from about 25° C. to about 800° C., or from about 25° C. to about 750° C., or from about 25° C. to about 700° C., or from about 25° C. to about 650° C., or from about 25° C. to about 600° C., or from about 25° C. to about 550° C., or from about 25° C. to about 500° C., or from about 25° C. to about 450° C., or from about 25° C. to about 400° C., or from about 25° C. to about 350° C., or from about 25° C. to about 300° C., or from about 25° C. to about 250° C., or from about 25° C. to about 200° C., or from about 25° C. to about 150° C., or from about 25° C. to about 100° C., or from about 50° C. to about 800° C., or from about 100° C. to about 800° C., or from about 150° C. to about 800° C., or from about 200° C. to about 800° C., or from about 250° C. to about 800° C., or from about 300° C. to about 800° C. In one embodiment, the carbonaceous fibers may be heated from about 25° C. to about 900° C.

In one embodiment, the carbonaceous fibers may be doped with nitrogen while raising the temperature at heating rate of between about 1° C./min to about 25° C./min, or about 1° C./min to about 20° C./min, or about 1° C./min to about 15° C./min, or about 1° C./min to about 10° C./min, or about 1° C./min to about 5° C./min, or about 5° C./min to about 25° C./min, or about 10° C./min to about 25° C./min, or about 15° C./min to about 25° C./min, or about 20° C./min to about 25° C./min. In one embodiment, the carbonaceous fibers may be doped with nitrogen while raising the temperature at a heating rate of about 5° C./min.

In a further embodiment, phenolic fibers may be vacuum impregnated with urea aqueous solution and heated from about 25° C. to about 900° C. at 5° C./min under an inert atmosphere. In yet another embodiment, the phenolic fibers may be vacuum impregnated in argon with urea aqueous solution and heating the resulting mixture from about 25° C. to about 900° C. Advantageously, the resulting N-doped conductive fibrous material may remain free-standing and tough enough to be punched to electrode materials. Further advantageously, the resulting N-doped conductive fibrous material may exhibit further improved specific capacity.

The content of nitrogen in the conductive fibrous material may be tuned by varying the concentration of the urea solution and may be as high as 12.6%.

According to another aspect, there is provided an electronic device comprising the disclosed conductive fibrous material, the disclosed fibrous mat, or the disclosed electrode material.

Advantageously, the disclosed conductive fibrous materials may be useful in electrode materials for lithium ion batteries, catalyst substrates, active packaging and may also be applied in other energy storage devices such as electrochemical supercapacitors.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1a shows the SEM image of lignin-derived electrospun nanofibers wherein the weight ratio of lignin:PEO is 97:3. Diameters of the fibers are around 1 μm.

FIG. 1b shows the SEM image of lignin-derived electrospun nanofibers wherein the weight ratio of lignin:PEO is 90:10. Diameters of the fibers are around 1 μm.

FIG. 2a shows the SEM image of lignin-derived carbonaceous nanofibers wherein the weight ratio of lignin:PEO is 97:3. Diameters of the fibers are around 500 nm.

FIG. 2b shows the SEM image of lignin-derived carbonaceous nanofibers wherein the weight ratio of lignin:PEO is 90:10. Diameters of the fibers are around 500 nm.

EXAMPLES

Non-limiting examples of the invention and a comparative example will be further described in greater detail by reference to specific Examples, which should not be construed as in any way limiting the scope of the invention.

Materials

Lithium foil and 1M LiPF$_6$ in ethylene carbonate/dimethyl carbonate (1:1 v/v ratio) were used as the working electrode, counter electrode and electrolyte, respectively. All were assembled into 2032 button cells in an argon-filled glove box with moisture and oxygen levels of less than 1 ppm. The galvanostatic charge/discharge tests were performed using a NEWARE battery tester at different current densities with, a cutoff voltage window of 0.005-3.0 V. The cyclic voltammetry test was performed on an electrochemical workstation (PGSTAT302, Autolab) within a voltage window of 3.0-0 V and at a scan rate of 0.01 mV s$^{-1}$. The electrochemical impedance spectroscopy (EIS) study was conducted using the same electrochemical workstation in a frequency range of 106 to 10$^{-2}$ Hz and at an a.c. amplitude of 5 mV.

The morphologies of the nanofibers were observed under a field-emission scanning electron microscope (FESEM, JEOL JSM 6700) at an accelerating voltage of 5 kV. X-ray photoelectron spectra (XPS) were obtained on a VG ESCA LAB-220i XL X-ray photoelectron spectrometer with an exciting source of Al. Elemental analysis was performed on elemental analyze (EA, flash 1112 series) and raman spetra was recorded on micro raman system.

Example 1: General Synthesis

Conductive Fibrous Material Comprising Fused Carbonaceous Fibers

The disclosed free-standing N-doped fused carbonaceous nanofibers may be fabricated via electrospinning solutions of lignin and polyethylene oxide (PEO) in dimethylformamide (DMF) followed by thermal stabilization and subsequent carbonization with urea.

The weight ratio of lignin to PEO can be tuned from 99:1 to 80:20 via varying the concentration of the polymer solution.

Figure 1:
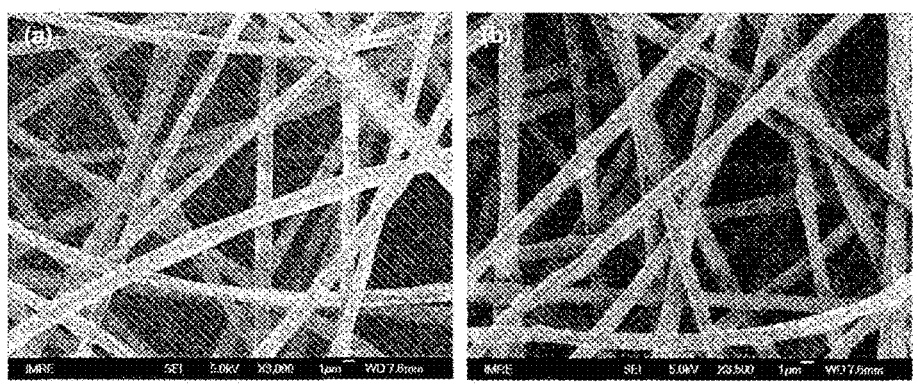
FIGS. 1a and 1b show the Scanning Electron Microscope (SEM) images of lignin-derived electrospun nanofibers prior to stabilization and carbonization.
Figure 2:
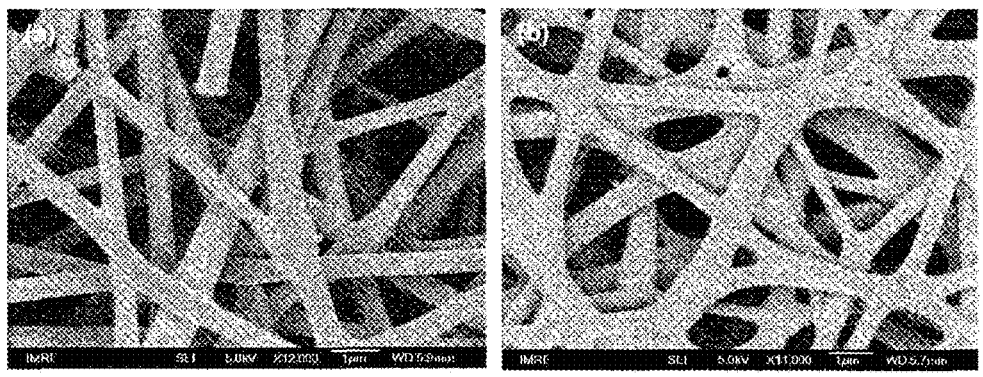
FIGS. 2a and 2b show the SEM images of lignin-derived electrospun nanofibers after being subjected to stabilization and carbonization.
Figure 3:
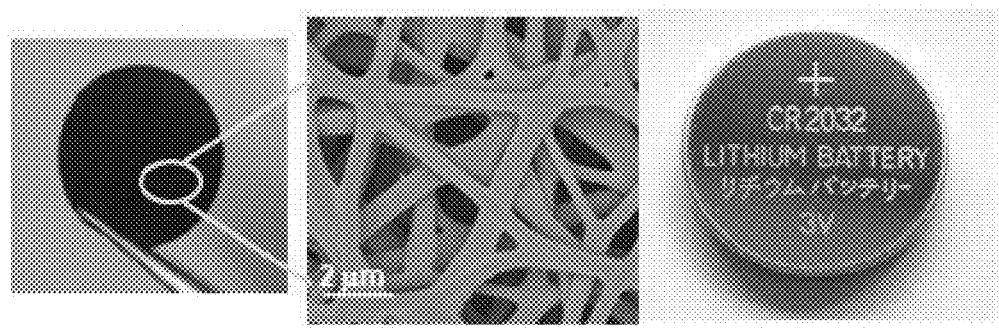
FIG. 3 depicts the disclosed conductive fibrous material comprising fused carbonaceous fibers in 2032 coin cells with lithium foil as the counter electrode.

FIGS. 1a and 1b show SEM images of the as-spun nanofibers with diameters around 1 μm prior to stabilization and carbonization. The as-spun fibers were stabilized in air by heating from room temperature to 200° C. at 1° C./min and subsequently carbonized under argon at different temperatures from 500 to 1000° C. It was observed that high proportions of PEO could result in fusing together of adjacent carbonaceous fibers (as shown in FIG. 2), which could be ascribed to the strong melting behavior of PEO during heat treatment. FIGS. 2a. and 2b show SEM images of the carbonaceous fibers after stabilization and carbonization with diameters of around 0.5 μm. As the polymer and lignin-derived fibers decompose during the carbonization process, the diameters of the resulting carbonaceous fibers are smaller with respect to their diameters prior to carbonization.

N-Doped Conductive Fibrous Material

To further improve electrochemical performance, the disclosed carbonaceous fiber mats were vacuum impregnated with urea aqueous solution, which were then subjected to high temperature treatment under argon to realize high levels of nitrogen doping. The content of nitrogen can be tuned by varying the concentration of the urea solution and could reach as high as 12.6% as characterized by elemental analysis. The resulting carbonaceous fiber mats remain free-standing and tough enough to be punched to electrode materials.

Example 2: Preparation of Fused Electrospun Carbonaceous Fiber Mats from Lignin 436 mg Alcell lignin and 48 mg polyethylene oxide (Mw 600K) were dispersed into 2 mL N,N-dimethylformamide (DMF) under magnetic stirring and the suspension was heated at 60° C. for 6 h. After cooling down to room temperature naturally under continuous stirring, the solution was placed in a 1 mL plastic syringe fitted with a flap tip 22 G needle and was electrospun using a horizontal electrospinning setup. Typically, electrospinning was performed at 6.5-7.0 kV with a feeding rate of 1 mL/h and the needle tip-to-plate substrate distance was 10 cm. The nanofibers were collected on aluminum foil and dried at 70° C. under vacuum overnight. The dried nanofibers were thermostabilized in a tube furnace under atmospheric environment. The temperature was ramped from 25° C. to 200° C. at 1° C. min$^{-1}$ and kept at 200° C. for 2 h. The stabilized fibers were then heated from 200° C. to 900° C. at 10° C. min$^{-1}$ under a flow of argon (150 cm$^3$ STP/min) and carbonized at 900° C. for 2 h.

Example 3: N-Doping of the Carbonaceous Fiber Mats 20 mg lignin-derived carbonaceous fiber mats (carbonized at 500° C. for 2 h) were immersed in 20 mL 10% urea aqueous solution and then dried under vacuum for several hours. The resulting mixture was heated from 25° C. to 900° C. at 5° C. min$^{-1}$ and kept at 900° C. for 2 h. After cooling down to room temperature, the obtained N-doped carbonaceous fiber mats were washed with deionized water and dried at 60° C. under vacuum overnight.

Example 4: X-Ray Photoelectron Spectroscopy (XPS) Analysis

Figure 4A:
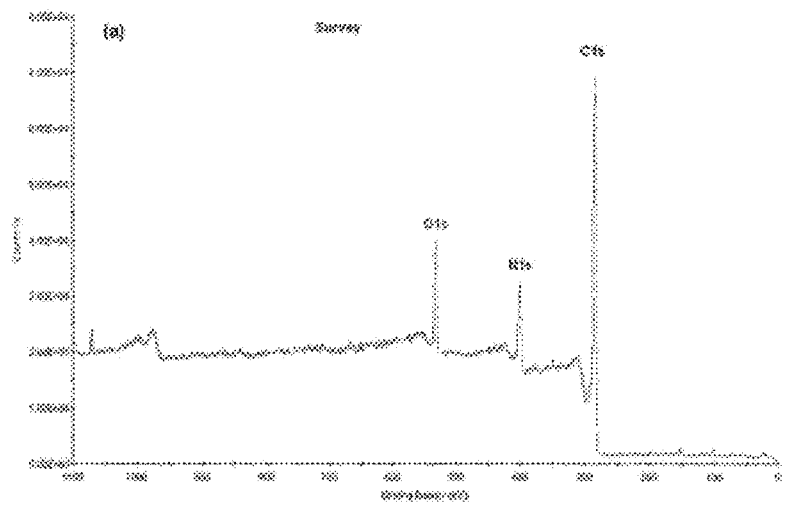
FIG. 4a shows the survey X-ray photoelectron spectra (XPS) of nitrogen-doped carbonaceous fibers.
Figure 4B:
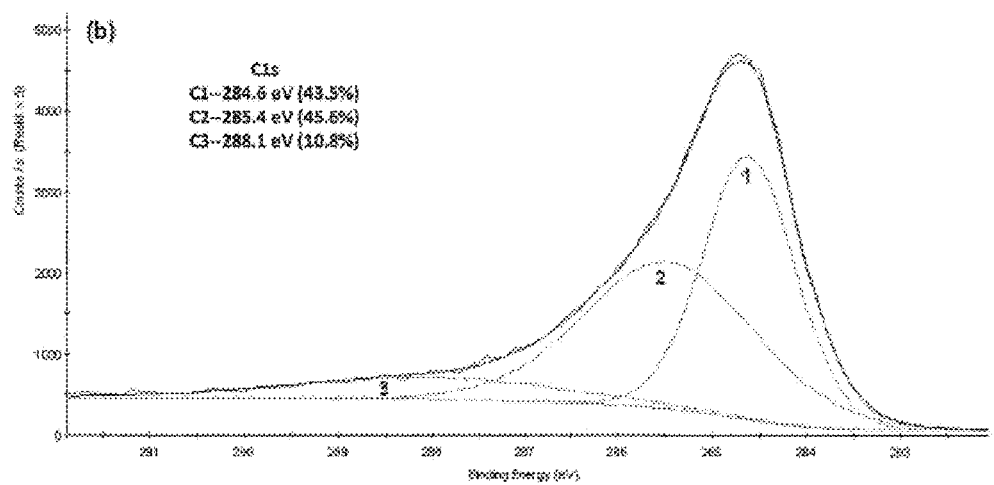
FIG. 4b shows the C1s XPS of nitrogen-doped carbonaceous fibers.
Figure 4C:
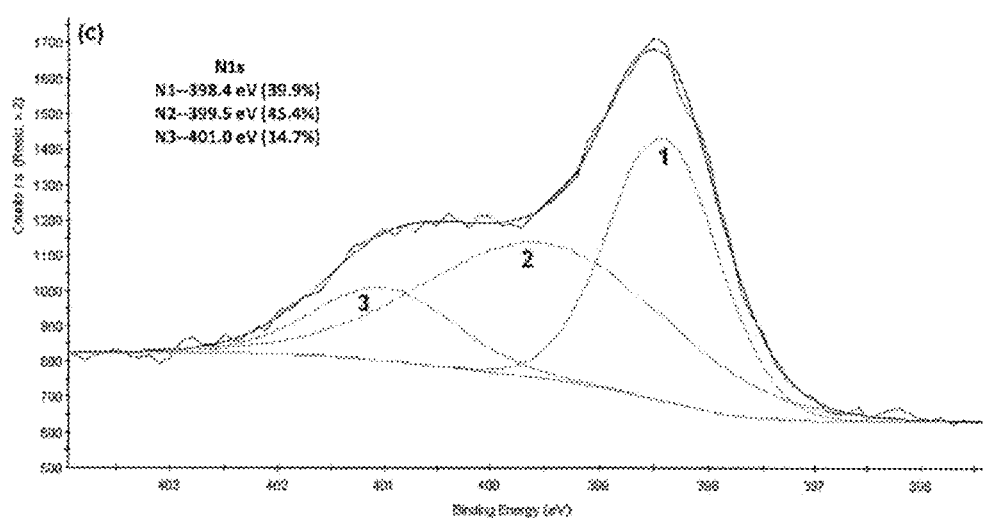
FIG. 4c shows the N1s XPS of nitrogen-doped carbonaceous fibers.
Figure 5:
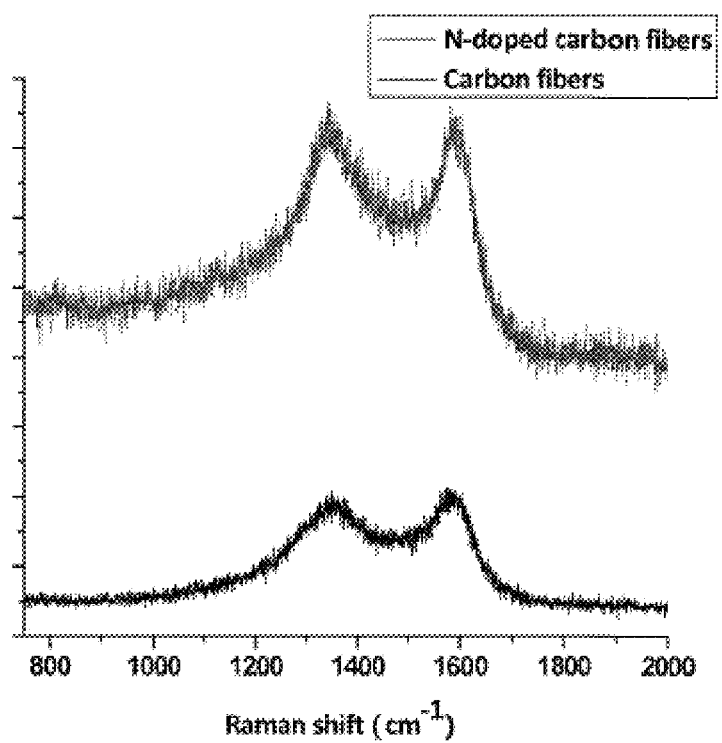
FIG. 5 shows the Raman spectra of lignin-derived carbonaceous fibers.

X-ray photoelectron spectroscopy (XPS) analysis was conducted to study the elemental composition and chemical states of the elements that exist in the N-doped fused electrospun carbonaceous fibers. FIG. 4a displays the survey spectrum (0-1000 eV) of the sample, which includes C1s, N1s and O1s without any other impurities. The C1s spectrum ranging from 283 to 291 eV is shown in FIG. 4b, which after peak fitting could be divided into three obvious peaks successfully. The binding energy at 284.6 eV may be attributed to graphitic carbon, which constitutes almost half of the carbon material. The peak centered at 285.4 eV corresponds to C—C/C—H and the peak at 288.1 eV could be assignable to small amounts of N—C=N group. The N1s spectrum in FIG. 4c can be fitted into three obvious peaks locating at 398.4 eV, 399.5 eV, and 401.0 eV, which indicate proportions of pyridinic nitrogen, pyrrolic nitrogen and graphitic nitrogen, respectively. The peak intensity ratio of D-band (1350 cm$^{-1}$, amorphous carbon) to G-band (1580 cm$^{-1}$ graphitic carbon) in the Raman spectra (FIG. 5) further demonstrates the proportions of graphitic structure in the lignin-derived carbon fibers.

Example 5: Electrochemical Performance Testing and Structure Characterization

Figure 6:
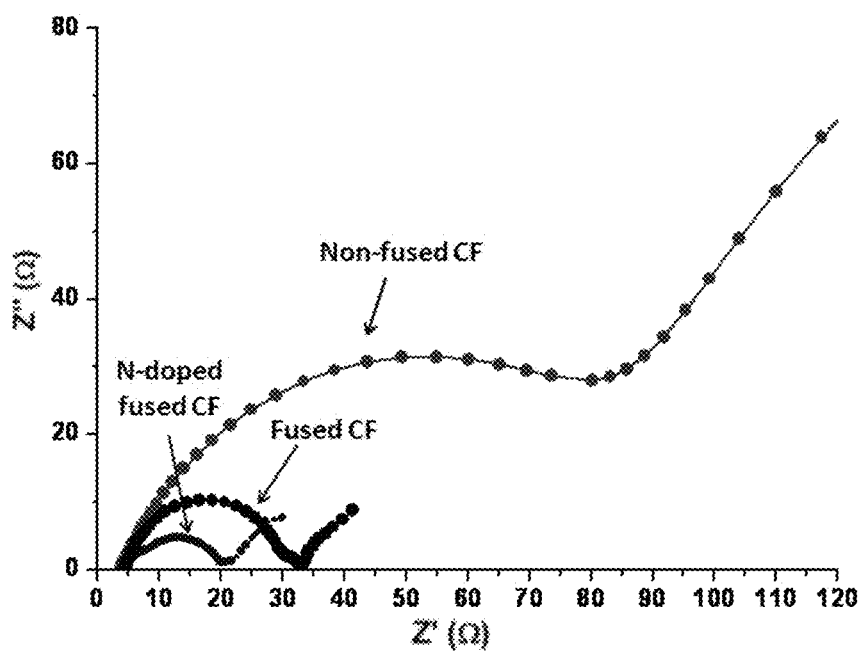
FIG. 6 shows the Electrochemical Impedance Spectroscopy (EIS) of lignin-derived non-fused electrospun carbonaceous fibers, fused electrospun carbonaceous fibers and N-doped fused electrospun carbonaceous fibers.
Figure 7:
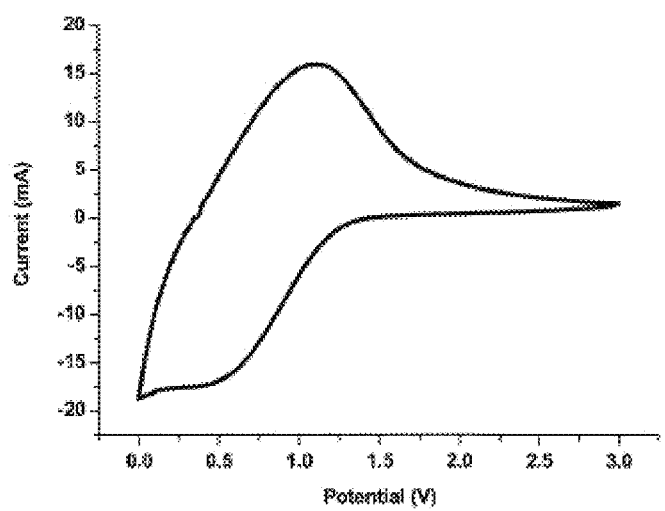
FIG. 7 shows the cyclic voltammogram of N-doped fused electrospun carbonaceous fibers. The voltage window and scanning rate are 3.0-0.0 V and 0.01 mV s$^{-1}$, respectively.
Figure 8:
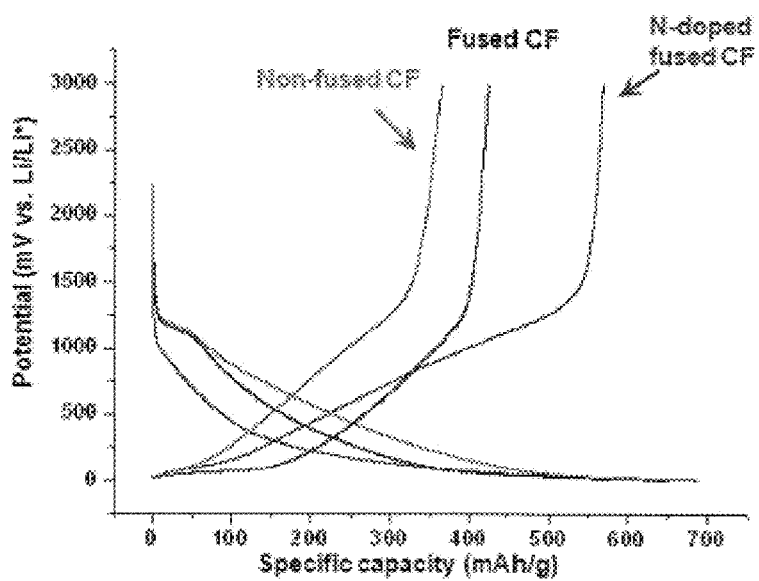
FIG. 8 shows the initial discharge/charge curves of carbon samples at a current rate of 30 mA g$^{-1}$.

The electrochemical properties of the lignin-derived carbonaceous fibrous mats as anode material for LIBs are evaluated through assembling 2032 coin cells with lithium foil as the counter electrode. The electrochemical impedance spectroscopy (EIS) analysis is shown in FIG. 6, which shows the electrical resistance of the carbon samples. The fused carbonaceous fiber mats exhibit very low interfacial resistance as well as charge transfer resistance, much lower than that of the non-fused ones. The conductivity may be further improved by doping nitrogen into the carbonaceous fibers. Cyclic voltammograms are performed to study the reaction mechanism of the N-doped carbonaceous fibers (as shown in FIG. 7). The intercalation of lithium can be observed below 1.2 V and the extraction of lithium from carbon occurred at low potential with a broad peak extending to 1.5 V. These results are typical for carbon materials as anode in lithium-ion batteries. The initial charge-discharge curves at a current density of 30 mA g$^{-1}$ are depicted in FIG. 8. Compared to the lignin-derived pure carbonaceous fibers which have a good capacity above 400 mA g$^{-1}$, the carbonaceous fibers with nitrogen doping exhibit much higher capacity at 576 mA g$^{-1}$.

Comparative Example 1

The specific capacitances of the presently disclosed lignin-derived carbonaceous fibers and presently disclosed lignin-derived N-doped carbonaceous fibers were compared with PAN-derived carbonaceous fibers and graphite at various current rates.

Figure 9:
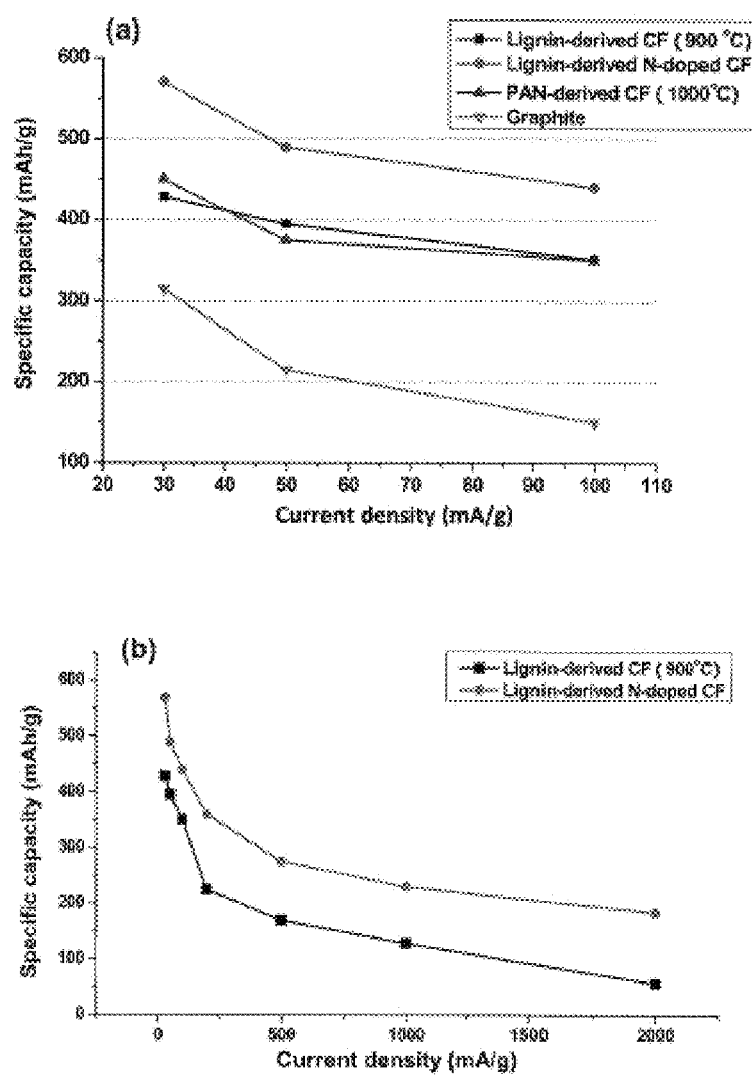
FIG. 9a shows the specific capacitances of lignin-derived carbonaceous fibers, lignin-derived nitrogen-doped carbonaceous fibers, PAN-derived carbonaceous fibers and graphite at various current densities.
FIG. 9b shows the specific capacitances of lignin-derived carbonaceous fibers and lignin-derived nitrogen-doped carbonaceous fibers at various current densities.
Figure 10:
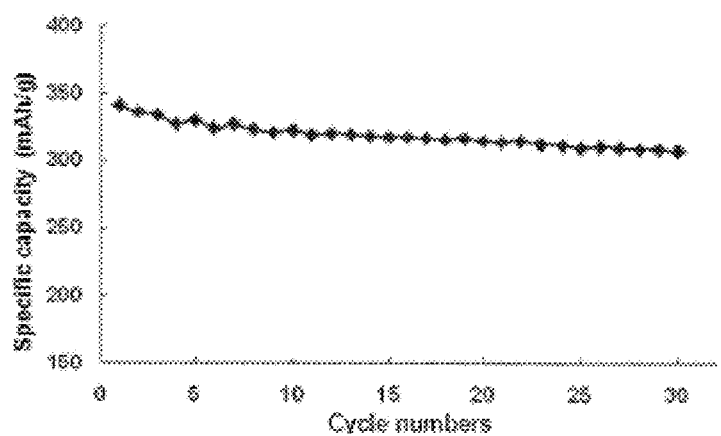
FIG. 10 shows the cycling stability at a current density of 372 mA g$^{-1}$ (1C) of nitrogen-doped carbonaceous fibers.
Figure 11:
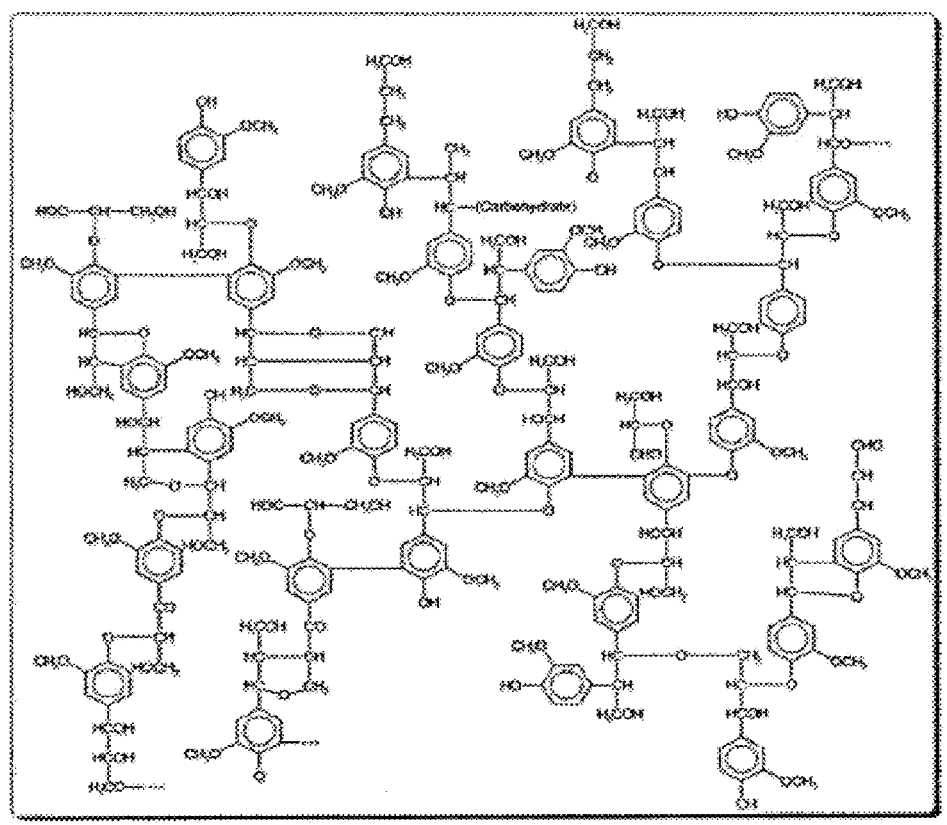
FIG. 11 shows a proposed structure of lignin.
Figure 12:
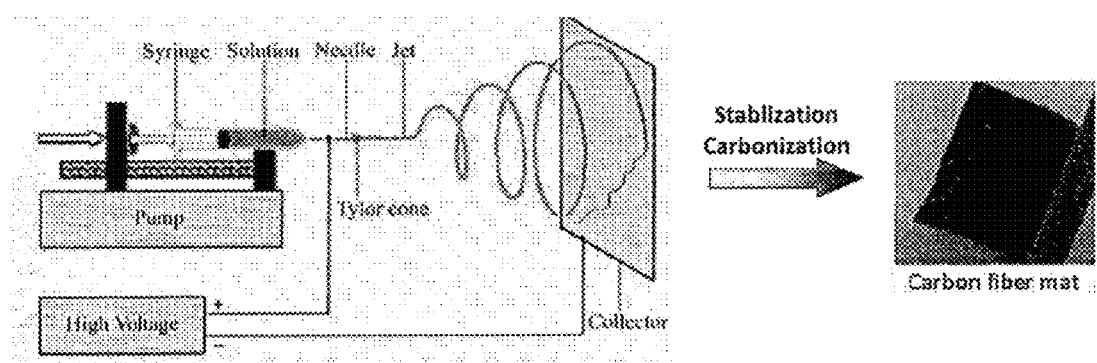
FIG. 12 shows a schematic diagram of the electrospinning process.

FIG. 9 shows that the lignin-derived fused carbonaceous fibers without nitrogen doping exhibit similar performance as the PAN-derived carbonaceous fibers. However, the rate capacities of the nitrogen-doped carbonaceous fibers far exceeded those of the PAN-derived carbonaceous fibers and even at a very high current density of 2 A g$^{-1}$, a satisfying capacity value of 183 mA h g$^{-1}$ was still achieved with the N-doped carbonaceous fibers. Moreover, the N-doped carbonaceous fibers also showed good cyclic stability at a current rate of 1 C (FIG. 10).

APPLICATIONS

The disclosed conductive fibrous material and the process of making the same may be used in an electrode for a lithium-ion battery in a variety of applications including, electronic devices, such as computers and various hand-held devices, motor vehicles, power tools, photographic equipment, and telecommunication devices.

The disclosed conductive fibrous material may be fabricated from low-cost, abundant and renewable feedstock which advantageously leads to reduced costs, easy accessability and processability.

The disclosed conductive fibrous material may comprise carbonaceous fibers that are fused to each other which advantageously leads to high conductivity, specific surface area and enhanced electrochemical performances when used as an electrode material in lithium-ion batteries.

The disclosed conductive fibrous material may further be doped with nitrogen which advantageously leads to further improvised specific capacities and electrical conductivity when used in an electrode material for lithium-ion batteries.

The disclosed conductive fibrous material may be made by a simple and straightforward fabrication process which can be conducted on a large-scale.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A conductive fibrous material comprising a plurality of carbonaceous fibers, wherein the carbonaceous fibers have a diameter of about 0.1 μm to about 15 μm and each carbonaceous fiber is fused to at least one other fiber, wherein the carbonaceous fibers are fused at fiber-to-fiber contact points by a low-melting point polymer selected from the group consisting of homo-polyether, co-polyether, co-polyetherpolyester, and polymer blends thereof, wherein the weight ratio between a carbonaceous fiber precursor to polymer is from 99:1 to 80:20, and wherein the carbonaceous fibers are electrospun.

2. The material according to claim 1, wherein a major portion of the carbonaceous fibers are fused at multiple fiber-to-fiber contact points.

3. The material according to claim 2, wherein the polymer has a melting point of below 200° C.

4. The material according to claim 2, wherein the polymer has a molecular weight from about 100,000 to 1,000,000.

5. The material according to claim 1, wherein the polymer is selected from the group consisting of polyethylene oxide, polypropylene oxide, and poloxamer 407, preferably wherein the homo- or co-polyether is selected from the group consisting of homo-(polyalkylene oxide), co-(polyalkylene oxide), and poloxamer.

6. The material according to claim 1, wherein the carbonaceous fiber precursor is a phenolic fiber, preferably wherein the carbonaceous fiber precursor is derived from lignin, and preferably wherein the lignin is selected from the group consisting of: organosolv lignin, softwood kraft lignin, hardwood kraft lignin and lignosulfonate.

7. The material according to claim 1, wherein said material is doped with nitrogen, preferably wherein the content of nitrogen is in the range of 0.1% to 0%.

8. The material according to claim 1, wherein the carbonaceous fibers have nano- or micro-scale diameters.

9. A process for forming a conductive fibrous material according to claim 1, comprising:
(a) mixing a phenolic polymer with a second polymer to form a polymer solution, wherein the weight ratio of phenolic polymer to second polymer is selected as being from about 80 to 99 weight percent of phenolic polymer to about 1 to 20 weight percent of second polymer;
(b) preparing phenolic fibers having nano- or micro-scale diameters by electrospinning the polymer solution of step a);
(c) carbonizing the phenolic fibers obtained through step b), thereby generating carbonaceous fibers, wherein each carbonaceous fiber is fused to at least one other fiber, wherein the second polymer is a low melting point polymer selected from the group consisting of homo-polyether, co-polyether, co-polyether-polyester, and polymer blends thereof.

10. The process according to claim 9, further comprising stabilizing the phenolic fibers prior to carbonization, preferably wherein the stabilizing comprises heat treating and oxidizing the phenolic fibers.

11. The process according to claim 9, wherein the carbonizing comprises heat treating the phenolic fibers in an inert atmosphere.

12. The process according to claim 9, comprising the step of selecting the phenolic polymer as being derived from lignin, preferably wherein the lignin is selected from the group consisting of: organosolv lignin, softwood kraft lignin, hardwood kraft lignin and lignosulfonate.

13. The process according to claim 9, comprising the step of selecting the second polymer as having a melting point below 200° C.

14. The process according to claim 9, wherein the second polymer has a molecular weight from about 100,000 to 1,000,000.

15. The process according to claim 9, wherein the second polymer is selected from the group consisting of polyethylene oxide, polypropylene oxide, and poloxamer 407, preferably wherein the homo- or co-polyether is selected from the group consisting of homo-(polyalkylene oxide), co-(polyalkylene oxide), and poloxamer.

16. The process according to claim 9, wherein the polymer solution of step a) further comprises a polar solvent, preferably wherein the polar solvent is selected from the group consisting of acetone, acetonitrile, N,N-dimethylformamide (DMF), tetrahydrofuran (THF), ethyl acetate (EtOAc), formamide, dimethyl sulfoxide (DMSO), acetamide water, ethanol, and methanol.

17. The process according to claim 9, further comprising the step of doping the carbonaceous fibers with nitrogen.

18. An electronic device comprising the conductive fibrous material of claim 1, a fibrous mat comprising the material according to claim 1, or an electrode material for energy storage devices comprising the material of claim 1.

* * * * *